US009026245B2

(12) United States Patent
Tilton et al.

(10) Patent No.: US 9,026,245 B2
(45) Date of Patent: *May 5, 2015

(54) CONTAINER-LESS CUSTOM BEVERAGE VENDING INVENTION

(71) Applicant: Ecowell, LLC, Pullman, WA (US)

(72) Inventors: Donald E. Tilton, Newman Lake, WA (US); Cameron T. Wheeler, Edmonds, WA (US); Brian L. Boler, Pasco, WA (US); Andrew C. Whitaker, Cambridge, MA (US); Reid A. Schilperoort, Pullman, WA (US); Preston F. David, Pullman, WA (US)

(73) Assignee: Ecowell, LLC, Pullman, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/798,296

(22) Filed: Mar. 13, 2013

(65) Prior Publication Data

US 2013/0231774 A1    Sep. 5, 2013

Related U.S. Application Data

(63) Continuation of application No. 13/021,607, filed on Feb. 4, 2011, now Pat. No. 8,442,674.

(60) Provisional application No. 61/301,959, filed on Feb. 5, 2010.

(51) Int. Cl.
G07F 13/06        (2006.01)

(52) U.S. Cl.
CPC .................................... G07F 13/065 (2013.01)

(58) Field of Classification Search
CPC ............................... G07F 13/065; G07F 13/06
USPC .................. 700/233, 231, 232, 236, 237, 239
See application file for complete search history.

(56) References Cited

U.S. PATENT DOCUMENTS

| | | | |
|---|---|---|---|
| 4,278,186 A * | 7/1981 | Williamson | 222/36 |
| 4,979,641 A | 12/1990 | Turner | |
| 6,036,055 A * | 3/2000 | Mogadam et al. | 222/23 |
| 6,449,532 B1 | 9/2002 | Nicol | |
| 6,609,431 B1 | 8/2003 | Tietsworth et al. | |
| 6,759,072 B1 | 7/2004 | Gutwein et al. | |
| 7,438,941 B2 | 10/2008 | Gutwein et al. | |
| 7,439,859 B2 | 10/2008 | Humphrey | |
| 7,455,867 B1 | 11/2008 | Gutwein et al. | |
| 7,627,496 B2 | 12/2009 | Walker et al. | |
| 7,689,468 B2 | 3/2010 | Walker et al. | |
| 7,739,181 B2 | 6/2010 | Breitenbach et al. | |
| 7,750,817 B2 * | 7/2010 | Teller | 340/666 |
| 7,754,025 B1 * | 7/2010 | Crisp, III | 134/56 D |
| 7,757,896 B2 | 7/2010 | Carpenter et al. | |

(Continued)

*Primary Examiner* — Michael K Collins
(74) *Attorney, Agent, or Firm* — DLA Piper LLP (US)

(57) ABSTRACT

Methods and apparatus describing a convenience beverage vending machine and its operation are described. An embedded computer interface allows consumers to create their own drinks or choose from a menu of drinks. Drinks are dispensed in a re-usable container. The beverages may be made from hot water, cold water or carbonated water that is mixed with various flavors of syrup, sweeteners and nutritional supplements. Identification may be presented and the computer recognizes the consumer and pulls up that consumer's account to determine funds available and previous drink selections and mixtures. The machine may incorporate an automatic cleaning cycle for both the valves and the dispense area.

10 Claims, 10 Drawing Sheets

(56) References Cited

U.S. PATENT DOCUMENTS

| | | |
|---|---|---|
| 7,768,396 B2 * | 8/2010 | Teller ............................ 340/540 |
| 7,783,381 B2 | 8/2010 | Walker et al. |
| 7,856,910 B2 | 12/2010 | Kwok |
| 7,857,910 B2 | 12/2010 | Carhuff et al. |
| 7,899,713 B2 | 3/2011 | Rothschild |
| 7,912,579 B2 * | 3/2011 | Stettes .......................... 700/237 |
| 7,913,879 B2 | 3/2011 | Carpenter et al. |
| 8,003,145 B2 | 8/2011 | Gutwein et al. |
| 8,032,251 B2 * | 10/2011 | Monn ............................ 700/233 |
| 8,062,684 B2 | 11/2011 | Gutwein et al. |
| 8,103,378 B2 * | 1/2012 | Crisp, III ...................... 700/236 |
| 8,121,917 B2 | 2/2012 | Insolia et al. |
| 8,162,176 B2 | 4/2012 | Rudick |
| 8,162,181 B2 | 4/2012 | Carpenter et al. |
| 8,251,258 B2 | 8/2012 | Rudick et al. |
| 8,340,815 B2 | 12/2012 | Peters et al. |
| 8,442,674 B2 * | 5/2013 | Tilton et al. .................. 700/233 |
| 8,504,196 B2 * | 8/2013 | Wiles ............................ 700/233 |
| 8,814,000 B2 | 8/2014 | Rudick |
| 2003/0188740 A1 | 10/2003 | Tribelsky et al. |
| 2005/0276883 A1 | 12/2005 | Jeffrey et al. |
| 2006/0081653 A1 * | 4/2006 | Boland et al. ................. 222/243 |
| 2006/0238346 A1 * | 10/2006 | Teller ......................... 340/572.1 |
| 2006/0293956 A1 | 12/2006 | Walker et al. |
| 2007/0271194 A1 | 11/2007 | Walker et al. |
| 2008/0033595 A1 | 2/2008 | Packes, Jr. et al. |
| 2008/0033824 A1 | 2/2008 | Packes, Jr. et al. |
| 2008/0040211 A1 | 2/2008 | Walker et al. |
| 2009/0065520 A1 | 3/2009 | Peters et al. |
| 2009/0069931 A1 * | 3/2009 | Peters et al. .................. 700/236 |
| 2009/0069932 A1 | 3/2009 | Rudick |
| 2009/0069934 A1 * | 3/2009 | Newman et al. .............. 700/239 |
| 2009/0070234 A1 | 3/2009 | Peters et al. |
| 2009/0105875 A1 | 4/2009 | Wiles |
| 2009/0152345 A1 * | 6/2009 | Johnson ........................ 235/381 |
| 2010/0030355 A1 | 2/2010 | Insolia et al. |
| 2010/0049362 A1 | 2/2010 | Hatuka |
| 2010/0125362 A1 * | 5/2010 | Canora et al. ................. 700/236 |
| 2010/0145522 A1 | 6/2010 | Claesson et al. |
| 2010/0173048 A1 | 7/2010 | Miller |
| 2010/0176147 A1 | 7/2010 | Segers |
| 2010/0268378 A1 | 10/2010 | Sharpley |
| 2011/0017776 A1 * | 1/2011 | Metropulos et al. ........ 222/129.1 |
| 2011/0049180 A1 | 3/2011 | Carpenter et al. |
| 2011/0114647 A1 | 5/2011 | Hallberg |
| 2011/0264285 A1 | 10/2011 | Mattos, Jr. et al. |
| 2012/0035761 A1 * | 2/2012 | Tilton et al. .................. 700/233 |
| 2012/0123588 A1 | 5/2012 | Cloran et al. |
| 2012/0285986 A1 | 11/2012 | Irvin |
| 2013/0037565 A1 | 2/2013 | Newman |
| 2013/0231774 A1 * | 9/2013 | Tilton et al. .................. 700/233 |
| 2014/0081777 A1 | 3/2014 | Mastrodonato et al. |
| 2014/0142749 A1 | 5/2014 | Peters et al. |

* cited by examiner

CONTAINER-LESS CUSTOM BEVERAGE VENDING INVENTION

RELATED APPLICATIONS

This application is a continuation of U.S. patent application Ser. No. 13/021,607, filed Feb. 4, 2011, which claims the benefit of 61/301,959, filed Feb. 5, 2010, the subject matter of which is incorporated herein by reference.

BACKGROUND

Convenience beverage vending is a multi-billion dollar major industry world-wide. Today, market share is totally dominated by beverages sold in plastic bottles and aluminum cans. It is estimated that less than 15% of such beverage containers are currently recycled, leading to huge environmental waste In addition, most convenience beverages are predominately water, and consequently, there is a significant embedded energy in their bottling, transportation and distribution into the vending machines themselves.

There is a need for a new type of beverage vending that addresses the selection limitations and environmental concerns related to existing beverage vending machines.

SUMMARY

A convenience beverage vending machine and methods of dispensing convenience beverages are described. An embedded computer interface that allows customers to vend a wide variety of convenience beverages into their own re-usable containers is utilized. This vending machine is connected to a municipal water source and drain, in a similar fashion to a standard drinking fountain. This allows the bulk of the beverage contents to be supplied to the machine in a highly concentrated form, and mixed into a custom beverage in the machine, rather than transporting the water to the vending site. The municipal water entering the machine goes through a multi-stage filtration process that is custom tailored to the water quality at a specific location site.

The vending machine vends beverages that may be made from hot, cold or carbonated water, and everything from plain filtered water, to standard soft drinks, to fully custom beverages that are designed by the customer. Beverage ingredients may be stocked in the machine in one of two ways, both in highly concentrated forms. Beverage ingredients may be in the form of liquid syrups, either in industry standard "bag-in-box" format, cartridges, or in syrup tanks. Beverage ingredients may be in powder form and may appear in bulk powder containers and or low volume containers. Each machine holds a plurality of separate ingredients. Some of these may be standard beverages and the remainder may be separate ingredients including, but not limited to: multiple types of real fruit syrup concentrates, regular and low calorie sweetener syrups, multiple types of flavored nutritional supplements, and multiple types of flavor neutral nutritional supplements.

A human agent or user may approach the invention and present identification. The machine identifies the user as a customer and pulls up that customer's account. Further, the machine may locate a customer based on a global positioning system (GPS) or a proximity sensor and sign the customer in via a mobile device application. If desired, the user may add funds through the machine interface with physical currency or bill the amount necessary, for example, to a credit card. The machine may also pull up a list of that user's favorite or recently vended beverages. The user can then simply order from this list, order plain filtered water, a standard soft drink, favorite or top selling recipes recommended by the machine, or design a totally new custom beverage. In designing a new custom beverage, the user may select flavor types (which may be blended) and their relative flavor intensity. For example, the user could select 30% pomegranate and 70% blueberry, and then vary the intensity from light, like a flavor hinted water, to heavy, like a fruit juice. The user may also select additional sweetener, from a more standard sugar based sweetener, like cane/agave syrup, or a low calorie sweetener, like stevia/citrus extract. Again, the user may select a combination of these in various percentages, and then vary the intensity from lightly sweet to very sweet. Next, the user may optionally select a nutritional supplement mix, like immune boost, energy boost, multi-vitamin, etc., select their relative percentages, and then vary the amount, maybe according to body weight. For example, a child may use less nutritional supplement than an adult. After making all these selections, the beverage is automatically mixed and dispensed into the user's own container. If the user likes the drink, it may be saved to the user's account and stored in the database for future vending or editing to adjust the recipe. In another example, a customer may access a social media outlet, such as provided by Facebook, Inc. headquartered in Palo Alto, Calif., and "drink share" recipes. For example, a customer may access a social media outlet (e.g. Facebook®) via an electronic application such as an iPhone® application, Android® application and/or other electronic application, and "drink share" custom drink recipes. A customer may then choose to have a local machine vend a shared drink recipe discovered from the social media outlet experience. The local machine may be able to vend the requested shared drink recipe by accessing a remote database via an internet connection. For example, a customer may discover a shared drink recipe during a social media outlet experience and save it to a personal account. The personal account may be saved in a remote database, which the machines are able to access and subsequently vend a drink as requested by the customer.

A custom mix ratio beverage may also be created. Unlike a standard soda machine, which vends the syrup and water base in a fixed ratio simultaneously, the microprocessor control allows any combination of all of the multiple ingredients stocked in the machine to be mixed in variable proportion to each other, and to the base water. Standard soda fountain mix ratios may be pre-programmed so that standard soft drinks may be vended, or completely custom beverages designed by the individual users may also be vended.

An automatic cleaning cycle, incorporated into a novel vending cycle may also be incorporated. In a standard soda fountain, soda syrup/water mix drips slightly at the end of each vending operation. This causes the dispense area to be sticky and hence, it requires frequent cleaning. A mixing manifold may be incorporated that is first cleaned with an automatic clean cycle. This purges any drips that may have leaked into the manifold during the period between vending cycles. The mixing manifold multi-path solenoid valve on the end that is normally open to the machine drain is connected to the drain. The clean cycle is effectuated with hot water at approximately 190 degree F. and/or with a cleaning solution such as bleach.

The vending machine may also be equipped to provide for automated cleaning of valves. Solenoid valves and standard soda fountain dispensing valves alike can become sticky over time, and may fail to open or close correctly. In a standard soda fountain machine, the machine parts are frequently disassembled and cleaned and then reassembled. One embodiment of the vending machine utilizes a periodic valve cleaning cycle which may be executed via software or through manual control at certain defined intervals based upon events such as elapsed time, or number of vends of given syrup types.

The vending machine may also provide a unique billing/customer interface that enables the individual customer to create unique beverages and store their favorite recipes in the machine central database. Each machine may be connected via the internet to the main database. As each individual machine may be stocked with different ingredients, the user interface may display drink possibilities that can be made in the specific machine that the customer is using. The system may also enable features such as "parental controls." This feature may be enabled in machines deployed in schools, where parents may set limits on the number and type of beverages their children can vend, and may put limits on types of beverages or specific ingredients, such as sugar. The parent may also require a specific nutritional supplement in each beverage. In addition, customers may name drinks and submit them to be tried and rated by other customers, and the database may display the top rated/top selling recipes in the machine. The system may also enable features such as "own/operator controls." For example, the machine may incorporate lockout times. For example, the machine may be programmed to lock the machine to students during class times, while remaining open to teachers and/or staff.

The vending machine may also be able to vend beverages into containers of all different sizes, colors and translucencies. Often opaque containers are difficult to see through during beverage filling causing overfilling and spills. If the user knows the bottle/container size, they can select the appropriate size/amount of total beverage, and the microprocessor may adjust the quantities of all ingredients automatically and fill the container accurately, without overflowing the container. If the user makes a mistake, and does not know the size of the container, a manual or microprocessor controlled cycle may be activated to circumvent overfilling.

The vending machine may also provide the user with a safe experience. Since the machine may be used to vend hot, cold or carbonated beverages, there is a risk that some customer may vend a hot drink into an unsuitable container, such as a stainless steel bottle that is not insulated, potentially causing burns. For this reason, the vending machine may incorporate a temperature sensor. If the temperature on the surface of the bottle exceeds a safe level, the user may be alerted and the vending process halted.

Dispense area sanitation may also be incorporated in the vending machine. Traditional soda fountains utilize a dispense nozzle which is activated by pushing a disposable cup up against the dispense valve lever. If users were to use their own containers with this type of dispense mechanism, bacteria may be transmitted to the dispense lever and consequently between successive customers. In one embodiment of the vending machine, a recessed dispense tube may be utilized which is shielded so it cannot come in contact with users bottles, and the entire dispense area may be flooded with an anti-bacterial Ultra-Violet sterilization light.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to accompanying figures. In the figures, the left-most digit(s) of a reference number identies the figure in which the reference number first appears. The use of the same reference numbers in different figures indicates similar or identical items.

DETAILED DESCRIPTION

Figure 1:
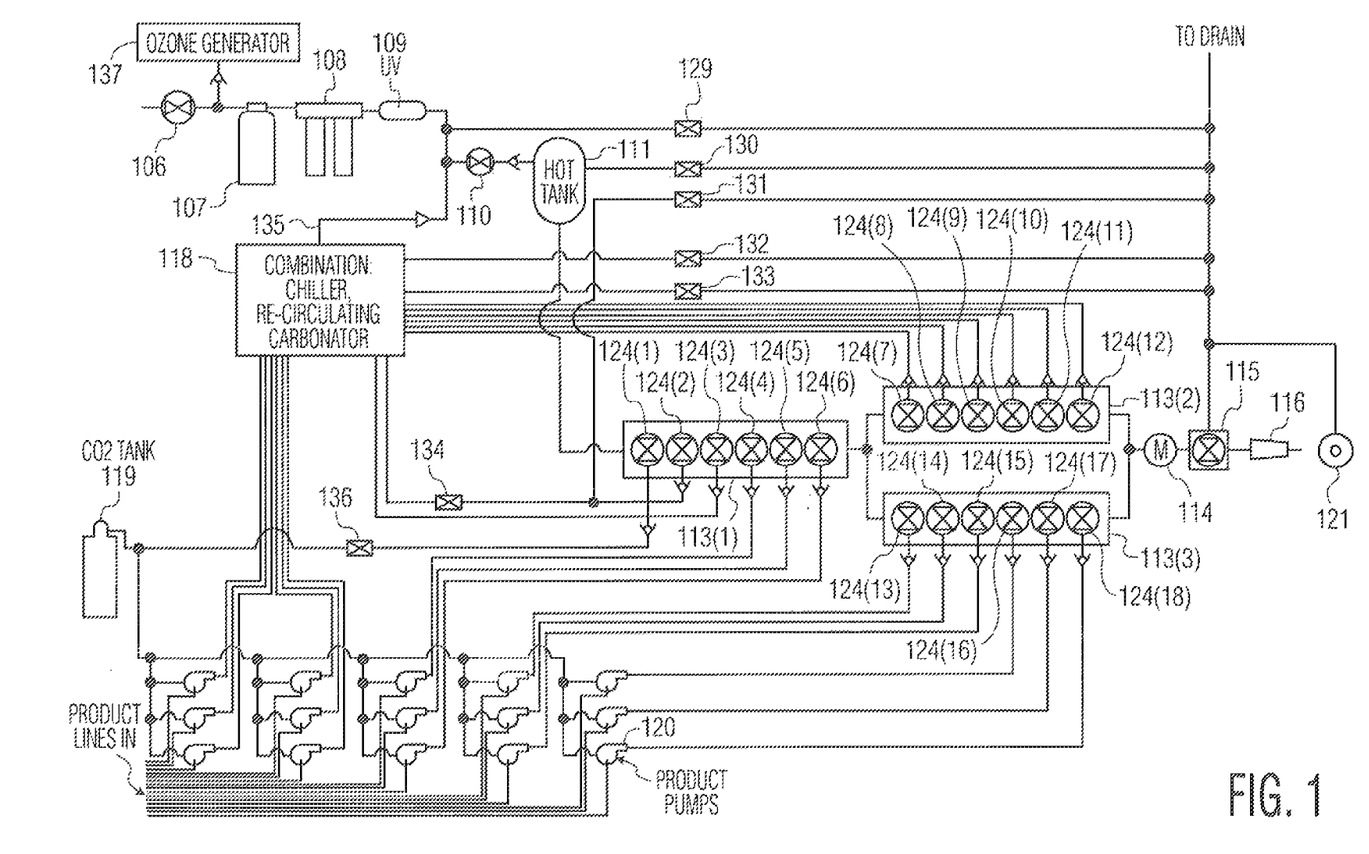
FIG. 1 is a schematic of an implementation of the plumbing system in the vending machine apparatus.
Figure 2:
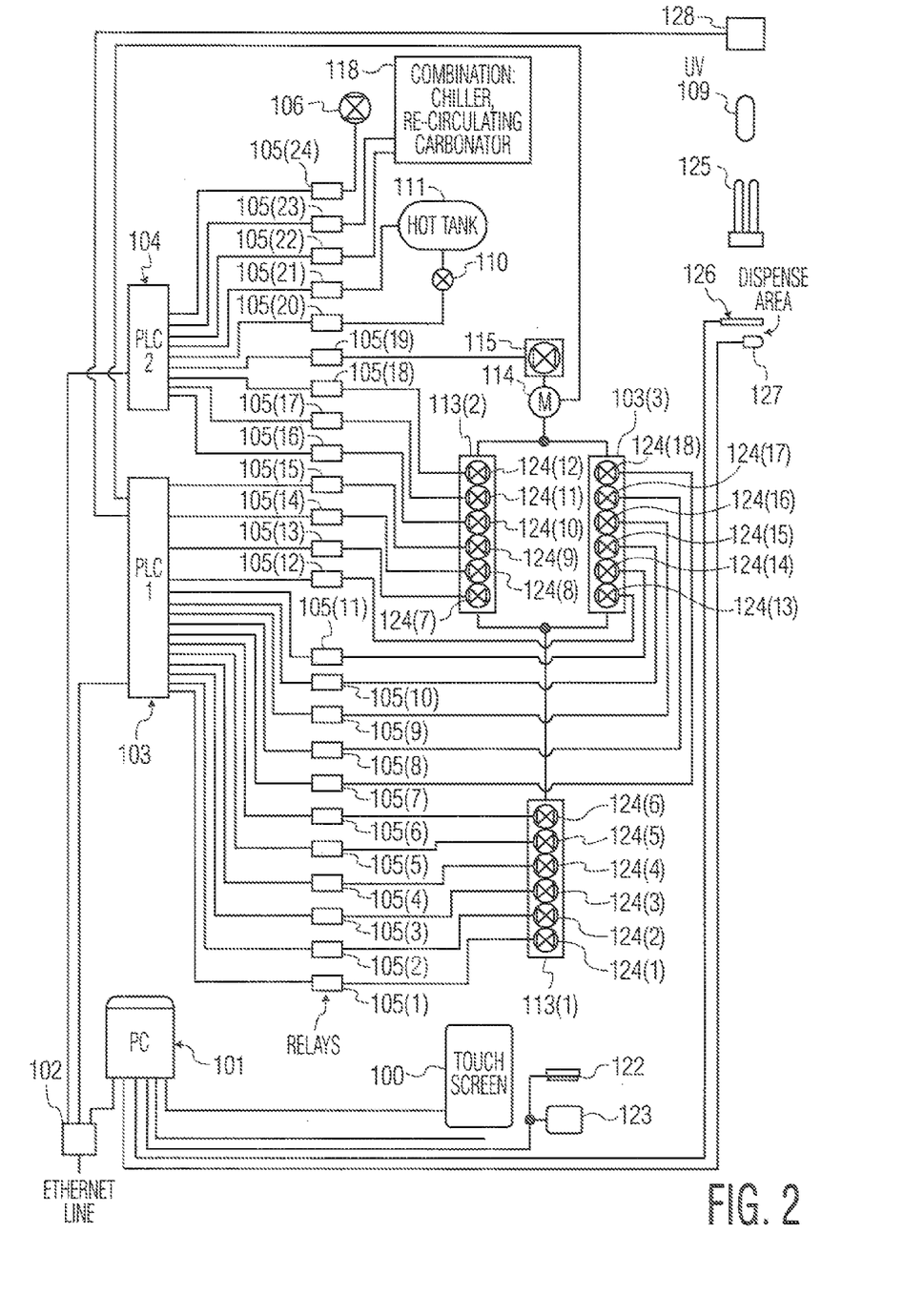
FIG. 2 is a schematic on an implementation of the electrical system in the vending machine apparatus.
Figure 3:
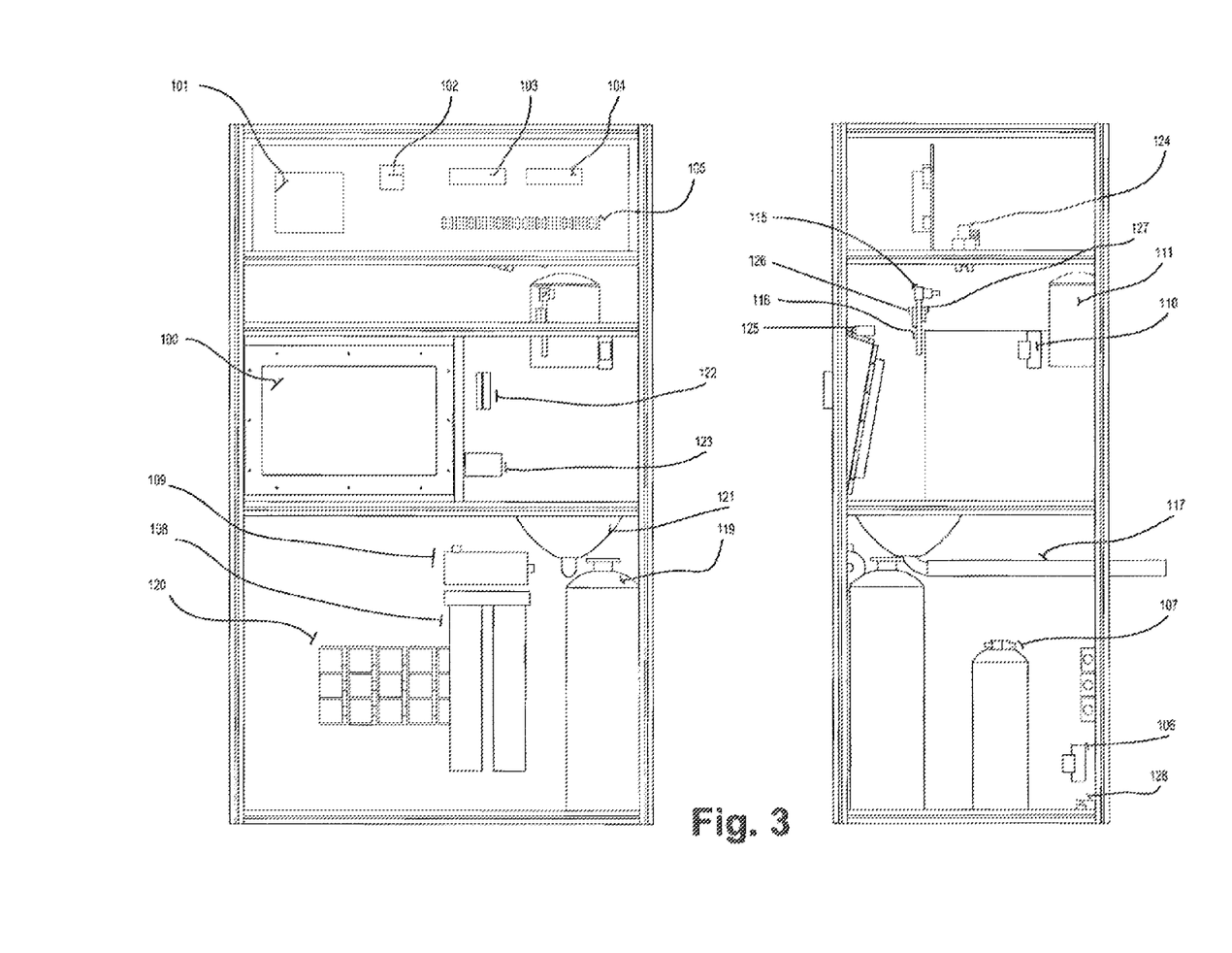
FIG. 3 is a depiction of an implementation showing the locations of components in the vending machine apparatus.

Referring to the drawings. FIG. 1 shows an implementation of the vending machine apparatus that may include a touch screen display 100. However, other implementations may include many other means for the delivery and/or reception of information to and from a user such as a keyboard, monitor, human interface device, or visual display. In an implementation, a personal computer (PC) containing a processor or processors and memory 101 may communicate with the touch screen display 100 to receive and transmit information related to the information acquired by the display 100 and/or delivered by the PC 101. Other implementations may include other means for the delivery or reception of information to a component interacting with the user.

The PC 101 may convert received information to a format and/or language for communication with two Programmable Logic Controllers (PLCs) 103, 104. Other implementations may include a means to directly and/or indirectly communicate the user's input with one or more controller devices.

The PC 101 may communicate with two PLCs 103, 104 via an Ethernet router 102. The PLCs 103, 104 may send and receive information to and from the PC 101 which is directly related to the information retrieved from a user and/or the operation of said PLCs 103, 104. Other implementations may include single or multiple control devices and/or methods capable of directly or indirectly effectuating the user's desire. In one example, the user may select an option presented on the touch screen display 100 which may then be transmitted to the PC 101. PC 101 may then interpret the user's input and convert the input to a format and/or language intelligible to the PLCs 103, 104. The PC 101 may then transmit information necessary to accomplish the desire of the user to the PLCs 103, 104 via an Ethernet router 102.

In an implementation the PLC 103 controls a relay 105 connected to a solenoid valve 124 to effectuate the controlled flow of fluid and/or gas through the solenoid manifold 113. Alternative implementations may include single or multiple relays of varying types including solid state relays, polarized relays, latching relays, reed relays, or other means to control or directly influence the actuation of a valve or the flow of fluid. Other implementations may also include single or multiple valves actuated by pneumatic, hydraulic, electrical, and/ or other mechanical means. For example, the user's input after being communicated to the PLC 103 via the PC 101 and/or Ethernet router 102 may be effectuated by the activation of a relay 105 which activates a solenoid valve 124 allowing fluid to pass for an amount of time directly related to the user's input. Further, the user's input after being communicated to the PLC 103 via the PC 101 and/or Ethernet router 102 may be effectuated by the activation of a relay 105 which activates the solenoid valve 124 allowing fluid to pass for an amount of volume based on feedback from one or more flow sensors directly related to the user's input.

As illustrated in FIG. 1, an implementation utilizes a fluid system to effectuate the transportation, filtration, alteration and manipulation of one or more fluids and its properties. Water entering the vending machine apparatus passes through a normally closed safety solenoid valve 106. Valve 106 allows for the flow of fluid into the vending machine to be terminated at any time. An Ozone generator may be connected to the fluid path exiting valve 106 via a T-connection. Flow from the fluid path exiting valve 106 may be prevented from entering the Ozone generator via a check valve. In this implementation, the water passes through a water softening filter 107 to reduce magnesium, calcium, and other dissolved minerals to levels desirable and palatable for human consumption. After the softener 107, fluid passes through two activated carbon filters 108 orientated in series. The fluid the passes through an ultraviolet (UV) filter 109 before continuing to other components of the fluid system.

In summary, an implementation may use a four stage filtration process consisting of a softener 107, activated carbon filters 108, and a UV filter 109 to effectuate the delivery of water that is palatable and suitable for human consumption. However, other implementations may include varying quantities and types of purification and/or particulate filters necessary to effectuate the delivery of water that is palatable and suitable for human consumption. An implementation may include other means to reduce scale and/or water hardness such as a scale filter. Alternative implementations may omit the use of filtration in the fluid system.

The inlet fluid path may be divided to flow to several components. One component may be a solenoid valve 110 for controlling the flow of fluid to a hot tank or water heater 111. Another implementation may use one or more pneumatic, electric, hydraulic, and/or mechanical valves located before and/or after a heater tank to effectuate the flow of fluid to and from a heater tank.

The flow of fluid into the heater tank 111 may be directly controlled by the actuation of a solenoid valve 110. Fluid flow to and from the heater tank 111 passes through the inlet port and outlet port respectively. The outlet port may be directly connected to a fluid path that remains at atmospheric pressure at all times. Other implementations may utilize means to effectuate the heating of water such as a pressurized hot tank, instant water heater, or various other heat addition techniques.

The temperature of hot water may range from about 100 degree F. to 212 degree F. This hot fluid then follows a fluid path to a one way valve 112 which prohibits the backflow of fluid toward or into the heater tank 111. After the one way valve 112, the hot fluid passes through three manifolds 113, orientated with one in series and two in parallel, a fluid flow meter, and a 3-way normally open solenoid valve 115. At this point the hot fluid is diverted to a fluid path connected to the dispensing nozzle 116 or to a fluid path connected to a drain line 117. Another implementation may include one or more fluid paths which the hot fluid would follow directly and/or indirectly to the dispensing nozzle and/or drain. Yet other implementation may include means necessary to guide hot fluids from a source to a destination in the fluid system resulting in the dispensing and/or draining of said fluid.

Fluid may also enter a fluid treatment apparatus 118 which possesses the ability to cool and/or carbonate incoming fluid. This vending machine also possesses the ability to cool one or multiple incoming fluids all of which pass through unique fluid paths. Other implementations may include one or more apparatuses to effectuate the cooling and/or carbonating of fluid in the invention.

Fluid paths exiting the vending machine, such as a path dedicated to chilled fluid flow through a one way valve 112 to prevent backflow, and then to a dedicated solenoid valve 124 located on a manifold 113 may be incorporated. Each fluid path then follows a path similar to that of the hot fluid after entering a manifold.

Drain valves may be utilized to ensure the ability to drain fluid held by the present invention. Valves may be of a myriad of designs including but not limited to shut-off valves and solenoid valves. FIG. 1 illustrates an implementation of drain valves with a main line drain valve 129, a hot tank drain valve 130, a carbonated fluid drain valve 131, and an ice bath drain valve 132. Also an ice bath overflow fluid path or drain line 133 could be utilized to maintain on optimal fluid level in said is bath as a component of the chiller 118.

The temperature of the chilled product may range from about 60 degree F. to 32 degree F. For example, fluid may enter a combination water chiller, carbonator, and syrup chiller designed for soda-fountain style machines 118. Fluid exiting from the chilled water path then follows a path connected to a one way valve 124 and then to a normally closed solenoid valve located on a manifold. When the solenoid is activated, the chilled water flows through the manifolds 113, flow meter 114, and 3-way solenoid 115 directly to dispense. Other implementations may incorporate the use of one or more fluid paths and/or valves to control the flow of fluid from a fluid treatment device such as a water chiller and effectuate the dispense or disposal of said fluid. Carbonated fluid exiting the fluid treatment apparatus may follow a fluid path directly or indirectly connected to the dispense nozzle and the fluid path may be regulated by a device such as a needle valve 134 or through the use of an inline compensator or similar device. In another example, syrup may traverse a syrup chilling line and flow through a manifold 113, flow meter 114, and 3-way solenoid 115 to a dispensing nozzle.

One implementation utilizes a pressurized carbon dioxide ($CO_2$) tank 119 with outlet pressure regulated to supply a combination chiller/carbonator 118, product pump 120, and direct line with $CO_2$ gas. Other implementations may incorporate various other components requiring pressurized gas for pneumatic actuation, carbonation, direct use, and/or other applications requiring pressurized gas.

Gas entering a product pump 120 effectuates the operation of the pump and the flow of the product through a fluid path which bisects the product pump 120. For example, $CO_2$ gas actuates a pneumatic turbine pump which delivers positive pressure to incoming fluid thus causing the fluid to traverse an outflow fluid path. $CO_2$ gas may also follow a fluid path terminating at a one way valve 112 connected to a dedicated, normally closed, solenoid valve on a manifold 113. The flow through the fluid path may be regulated by a component such as a needle valve 135. The path then continues along a route similar to the chilled fluid as described previously. In other implementations gas may follow various routes terminating at a flow controlling component, such as a solenoid valve, pneumatic valve and/or mechanical valve effectuating the dispense or disposal of the gas. In other implementation, CO.sub.2 gas may enter a carbonation tank under pressure where it dissolves into the co-occupying fluid.

Pneumatically driven product pumps 120 may effectuate the transmission of product fluid from one or more containers to dispense or disposal along a fluid path similar to the chilled fluid as described previously. Alternative implementations may utilize other means for the transmission of product fluid to dispense or disposal via one or more fluid transmission methods such as electric pumps, pneumatic pumps, positive displacement pumps, hydraulic pumps, positive head, and any combination or isolated use thereof.

One implementation may utilize a combination of solenoid manifolds 113 to control the flow of fluid from unique and separate inflow paths to a common outflow path. For example, a six line manifold may contain six normally closed solenoid valves, each preventing a given fluid from entering the manifold. When a given solenoid valve is energized, fluid that was previously blocked by the solenoid flows through the manifold. Multiple solenoid valves 112 may actuate during overlapping time intervals allowing one or more fluids to enter the manifold through unique fluid paths and depart through a common path. Other means may also be used to achieve the controlled flow of single and/or multiple fluids through a common exit may also be utilized.

In another implementation, the vending machine may utilize a normally open 3-way solenoid valve 115 to control the flow of fluid to the dispense nozzle 116. The solenoid functions such that all fluid passing through an inlet departs through one of two unique outlet paths. When the 3-way solenoid 115 is energized all fluid passing through an inlet departs through an outlet path connected to the dispense nozzle 116. Other implementations may utilize methods such as a normally closed solenoid or other means by which to control the dispensing of a fluid.

A sink 121 may be located beneath the dispense nozzle 116 to capture disposed fluid and channels said fluid to a drain 117. Other implementations may use various methods to capture disposed fluid and pass said fluid to a drain.

An ultra violet (UV) sanitization light 125 may be utilized to effectuate the sanitization of the sink, dispense nozzle and or the dispense area.

Fluids may be transmitted to disposal exit through a drain pipe 117. Other implementations may use methods such as a reservoir with a submersible pump to expel disposed fluid from the invention.

An inductive float switch 128 may detect the presence of fluid at the base of the invention. Other implementations may use other fluid level sensing means.

A magnetic stripe card reader 122 may effectuate the transfer of funds from the consumer as payment for products delivered by the invention. For example, consumer approaches the invention and utilizes a VISA® credit card to purchase a beverage from the vending machine Other means may also be used to effectuate a payment, such as a cash and coin machine or other payment accepting device.

A near field radio frequency identification (RFID) reader 123 may effectuate the recognition of a known customer and enable the invention to respond to that customer in a personalized manner. For example, a customer approaches the machine and presents an RFID tag to the reader 123 which accepts an identification number from the customer's tag and transmits the information to a program which retrieves and utilizes information associated with the customer's identification number. The RFID tag may be a proximity card, a passive RFID tag, an active RFID tag, a Near Field Communications device, or any another RFID technology and/or frequency communication device suitable for effectuating the recognition of a known customer and enable the invention to respond to that customer in a personalized manner. Other implementations may use methods such as a user name, password, magnetic stripe card, smart card, and/or any similar method to effectuate the identification of known customers.

Single or multiple LED lights 126 may be used to illuminate a beverage container located below the dispense nozzle 116 and or for the purpose of illumination in the area where fluid is dispensed.

A camera 127 may be used to capture images of the path of fluid out of the dispense nozzle 116. The captured images may be still images and/or video images of the path of fluid out of the dispense nozzle 116.

Figure 4:
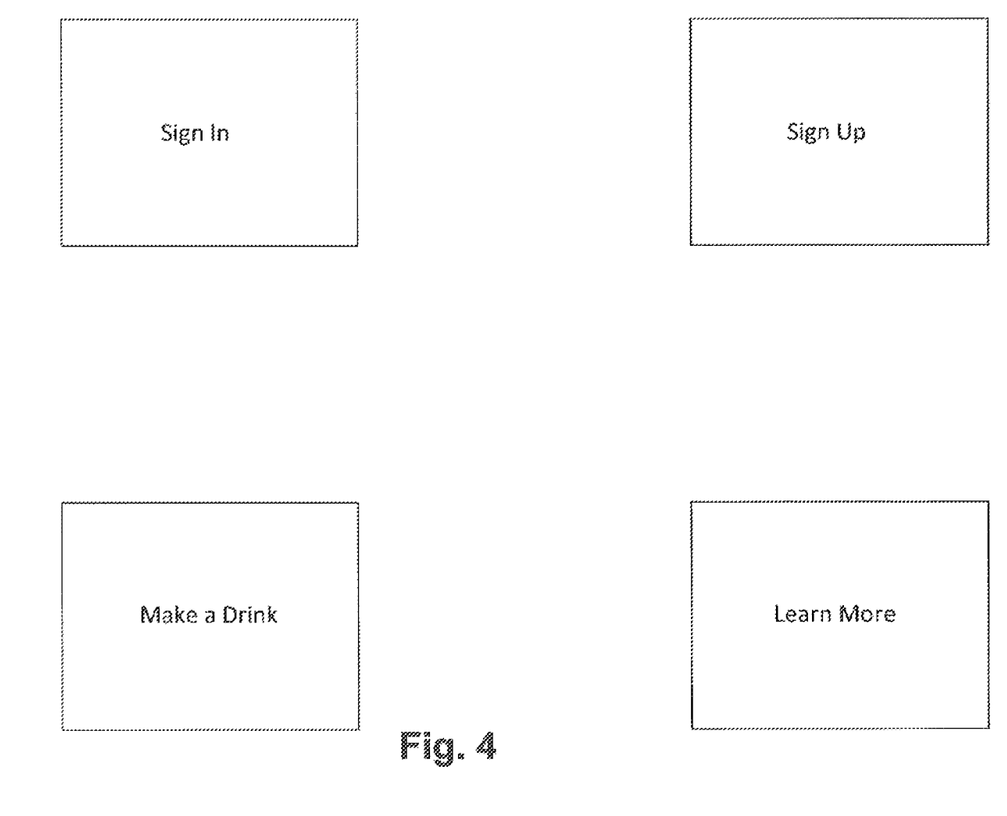
FIG. 4 is a depiction of an interface presented to the human agent to effectuate the dispense of a custom beverage.

The beverage selection and customization process may utilize a touch screen display 100 to effectuate communication between the vending machine and a user. Such communication enables the user to directly control the composition of a dispensed beverage. For example, FIG. 4 exemplifies an initial display image that an implementation may utilize. The user's identity becomes known to the invention at a "sign in" event. Preceding this event, an implementation may display an image as shown in FIG. 5.

Figure 5:
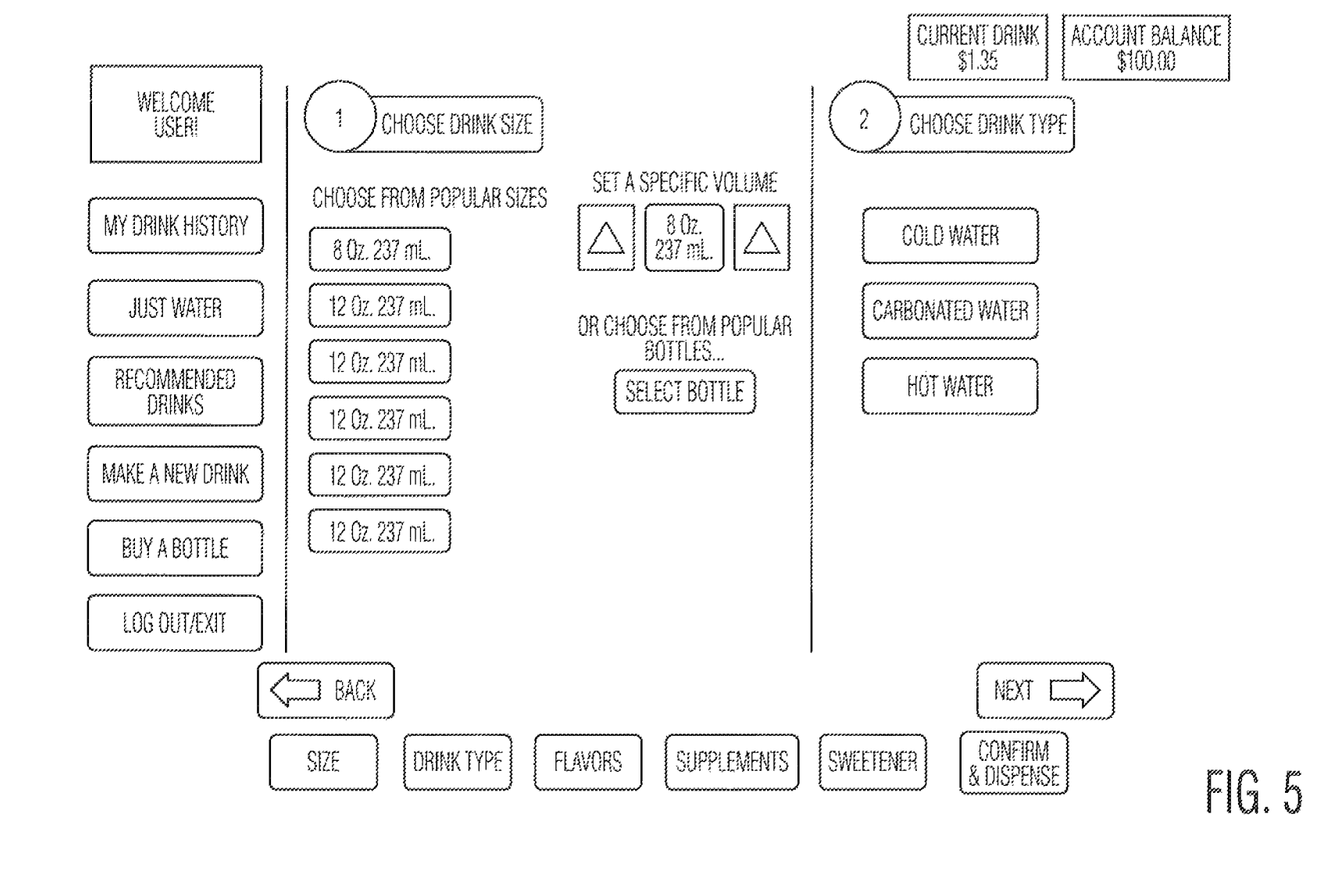
FIG. 5 is a depiction of an interface presented to the human agent to effectuate the dispense of a custom beverage.
Figure 6:
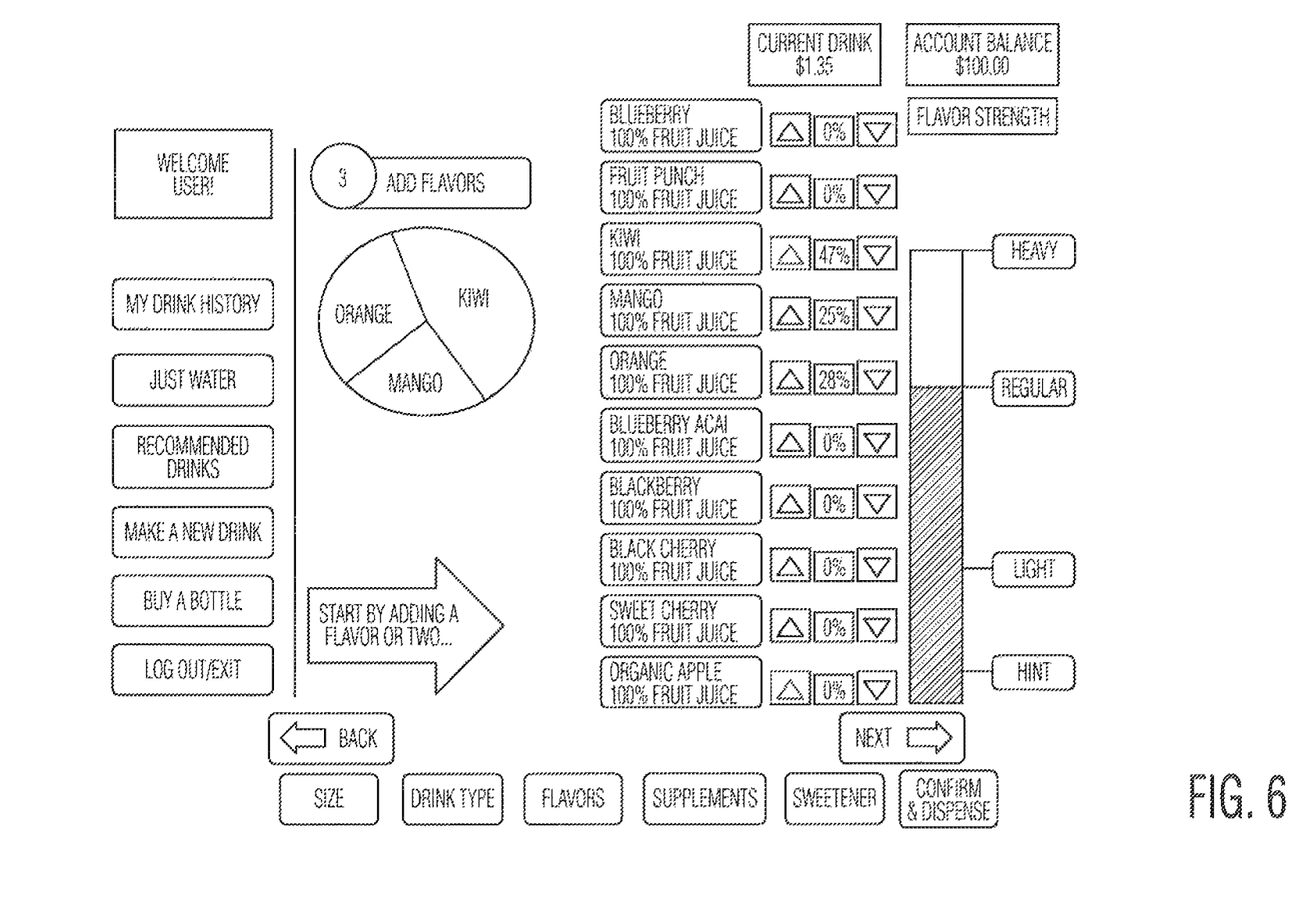
FIG. 6 is a depiction of an interface presented to the human agent to effectuate the dispense of a custom beverage.
Figure 7:
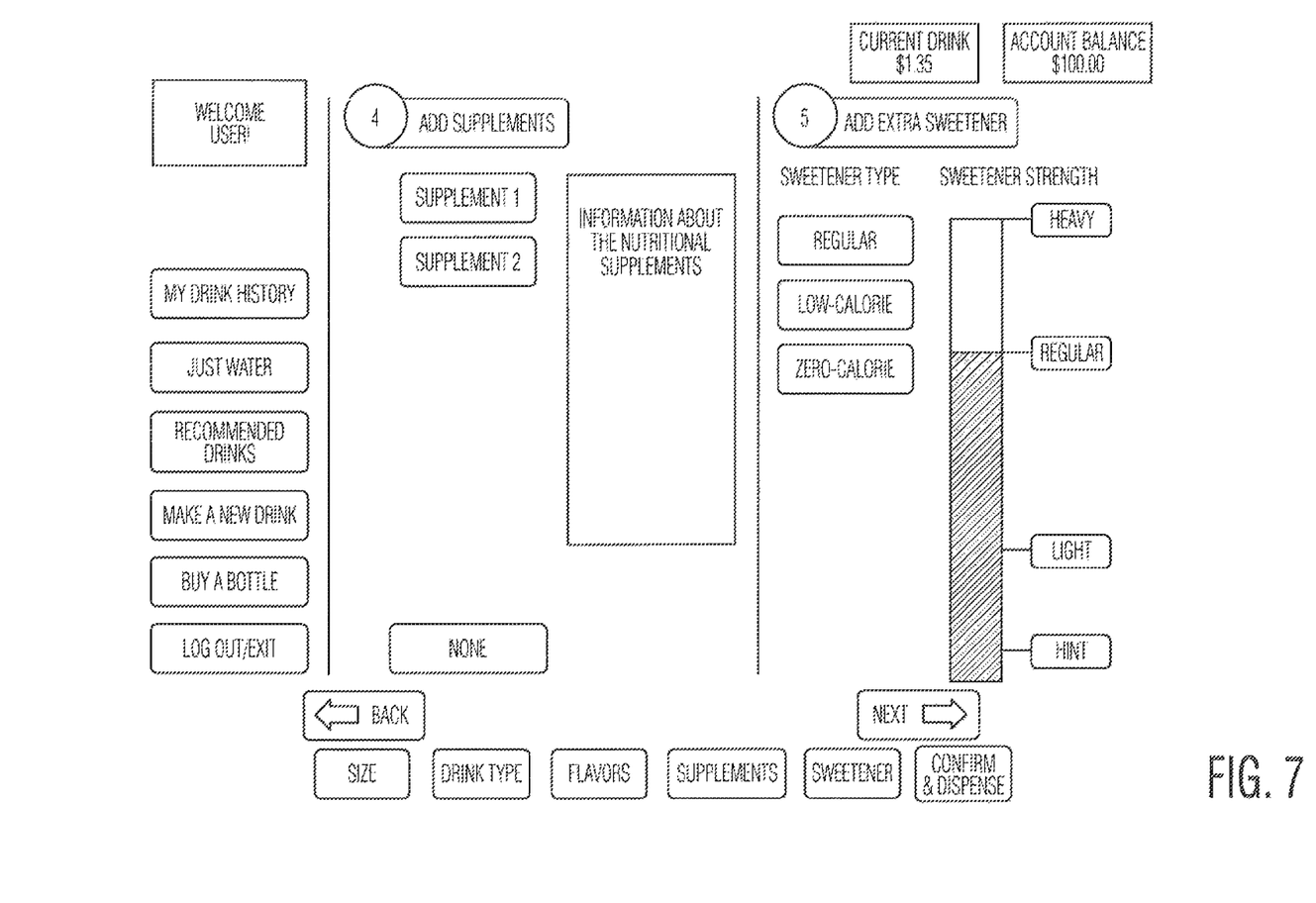
FIG. 7 is a depiction of an interface presented to the human agent to effectuate the dispense of a custom beverage.

An implementation may use display images such as shown in FIG. 4-9 for the beverage customization process. For example, a user utilizes a display image such as shown in FIG. 5 to select a desired drink volume. In one implementation, a beverage volume may range from about six fluid ounces to about sixty four fluid ounces or any similar volume related to a personal beverage container. The user then has option to select a main fluid type such as regular cold water, carbonated water, and hot water. However, other implementations may include main fluid types other than water such as a solution of water and ethanol alcohol. After that, a display screen, such as shown in FIG. 7, may be used to allow the user to select one or multiple supplemental fluids to add to the beverage. For example, the user selects kiwi, mango and orange fruit juice concentrates to be added to the custom beverage. The user then has the option to customize the ratio in which the supplemental fluids are added. The user may designate that the final combination of supplemental fluid contain 47% kiwi, 28% orange, and 25% mango fruit juice concentrates.

Other implementations may include similar but different means for the user to customize the specific supplemental fluid to be added. Other implementations may also include similar but different means for the user to customize the ratio in which the specific supplemental fluids are added. For example, a user may choose to create a beverage from multiple supplemental fluids at an infinite variety of ratios with the sum total equaling one or 100%. The arbitrary value of 100% may be associated with a value directly related to the user's desired flavor strength. If a user chooses five supplemental fluids at a flavor strength of "heavy," were heavy flavoring is known to be equal to one fluid ounce, then the five supplemental fluids may be combined at an infinite variety of ratios with the volume equal to a constant of one fluid ounce. Still other implementations may utilize means other than a total volume approach to enable a user to customize the mix ratios of supplemental fluids. Another implementation may be to set supplement volumes to static volumes or "shots." The shots may be of the same volume for an 8 oz drink and a 32 oz drink. A user may select one shot or more than one. Such other approaches may include setting the summation of supplemental fluid taste, viscosity, or other properties to meet the desire of the user.

After selecting supplemental fluids in a unique combination as per the user's desire, nutritional supplements may be added to the beverage through a display image as shown in FIG. 7. Nutritional supplements in liquid, powder, or other form may be added to the beverage or the total fluid volume dispensed in a fixed quantity, mass, or in a quantity proportional to a property of the beverage or the user's desire. For example, the user may choose a twenty fluid ounce beverage with a nutritional supplement. The total mass of supplement dispensed may be a fixed mass such as one gram. In another implementation, the mass of nutritional supplement may be proportional to the user's desired supplementation or proportional to the volume of the twenty ounce beverage. The user may also have the option of adding a sweetener to the custom beverage. The sweetener may consist of ingredients such as cane sugar, Stevia, agave sugar, or other sweeteners. These sweeteners may be added to the custom beverage in a manner similar to that described for the nutritional supplements.

Figure 8:
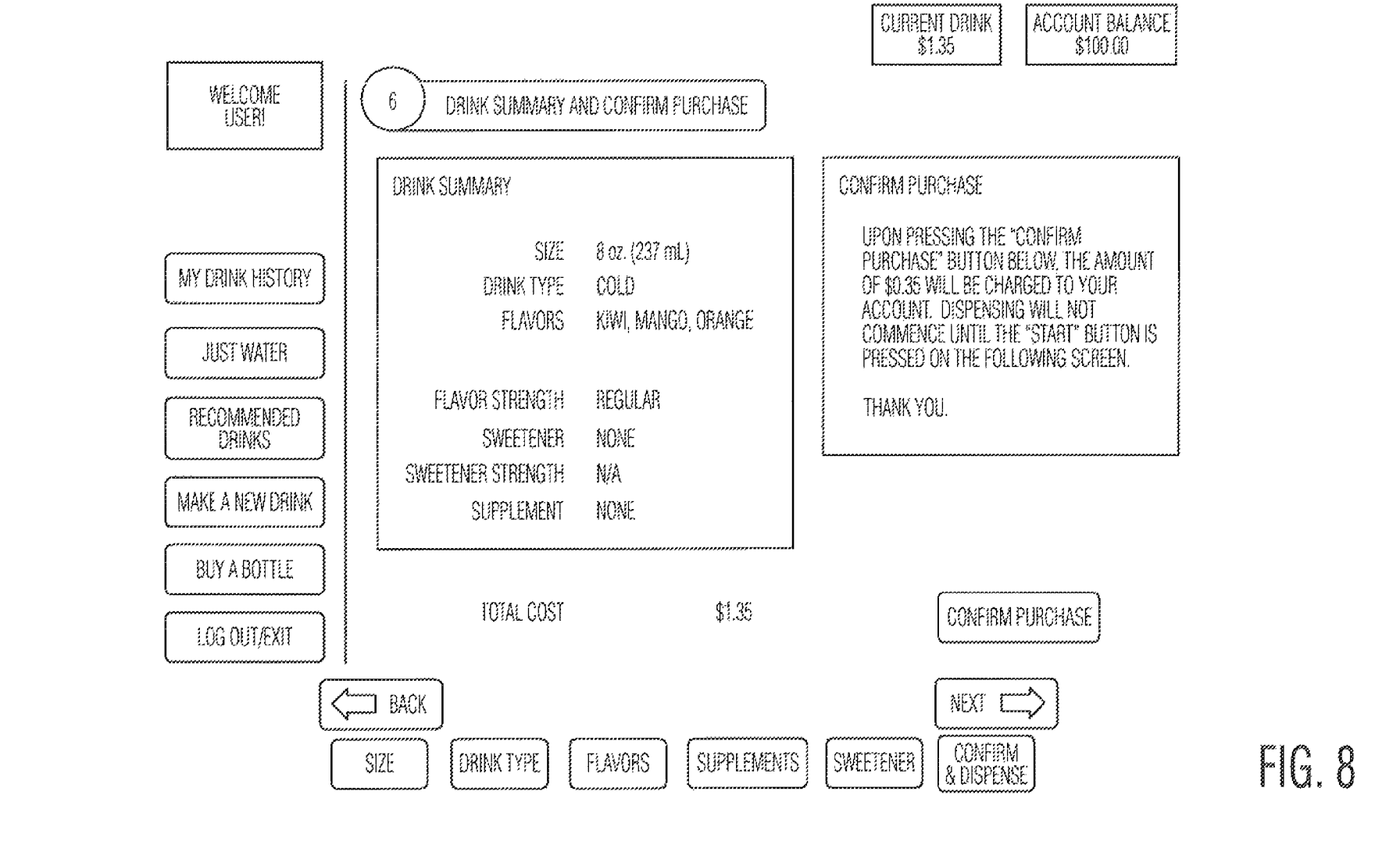
FIG. 8 is a depiction of an interface presented to the human agent to effectuate the dispense of a custom beverage.

The total mass of sweetener dispensed may be directly proportional to the beverage volume and the strength of sweetness desired by the user. Other implementations may include similar means to enable a user to customize the sweetness of a custom beverage. The user may also be presented with a display image as shown in FIG. 8 that informs the user of the final composition of the customized beverage that the user created through the drink customization process.

Figure 9:
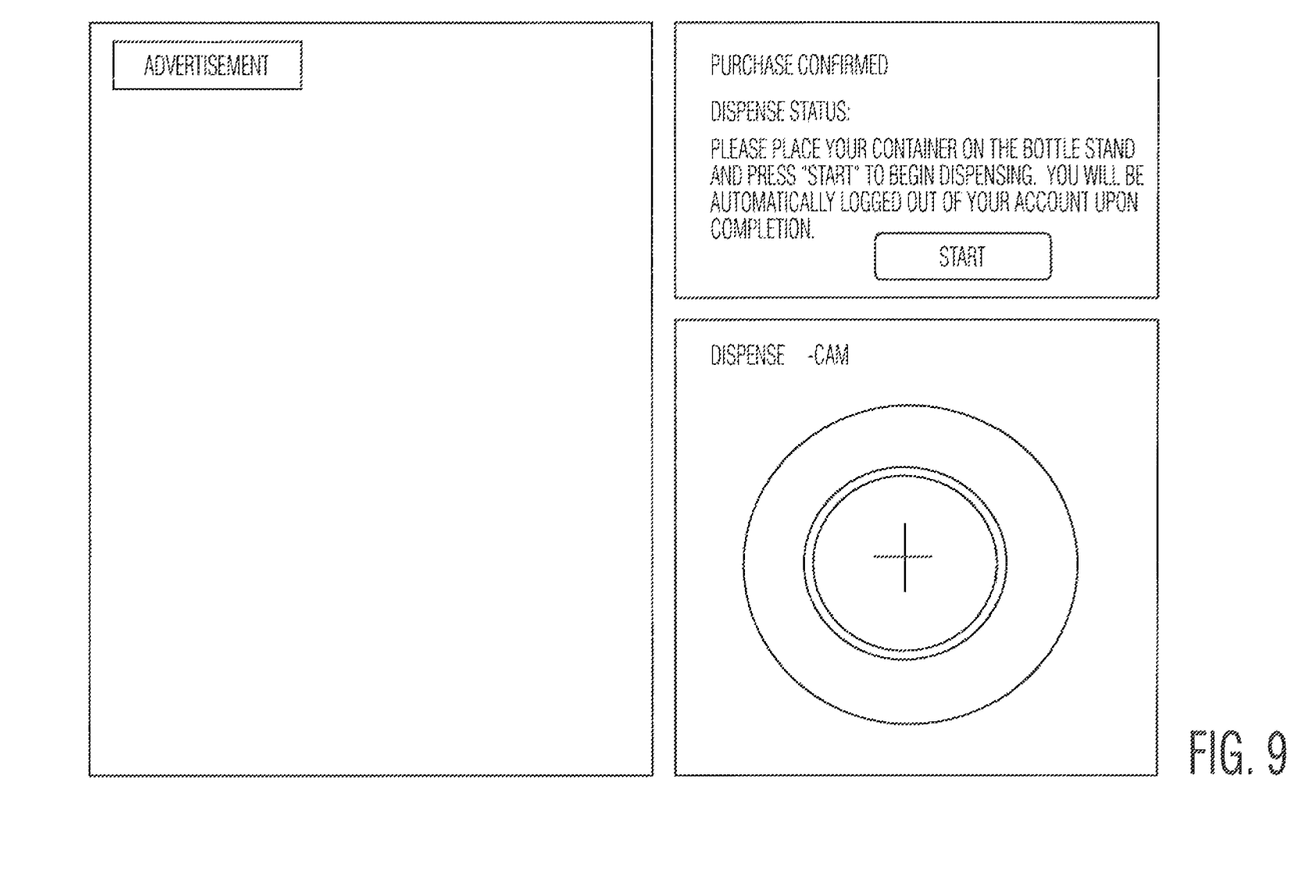
FIG. 9 is a depiction of an interface presented to the human agent to effectuate the dispense of a custom beverage.

At this point in the beverage customization process, the user has the option to confirm the purchase and/or final composition of the custom beverage. The user may also be presented with a display screen, as shown in FIG. 9, that presents various information to the user. This information may include advertisements which are presented to the user. These advertisements may be generic and/or targeted to the specific users. The display screen may also present social media interaction options. For example, users may choose to share their drink with their friends as their Facebook® status. Also, the final screen may allow the user to initiate the vending by pressing a button or through similar means of actuation.

A cleaning cycle may be utilized to ensure proper sanitization and performance. In one implementation, the vending machine may utilize an automated cycle to effectuate the cleaning and sterilization of one or more fluid paths. This cleaning may be effectuated by the circulation of hot water with a temperature of approximately 190 degree F. and/or a sanitizing fluid such as a bleach solution through one or more of the fluid paths. Another implementation may utilize ozone gas ($O_3$) to effectuate the sanitization of one or more fluid paths. Other implementations may utilize a similar cleaning cycle effectuated through manual means rather than automated. Also, various methods for determining the necessity of cleaning and sanitization may be incorporated in an implementation to initiate a cleaning cycle. Such methods may include the use of a flow characterization sensor to sense a change in the flow indicative of the necessity for a cleaning cycle. However, other implementations may utilize methods dictating a time interval between cleaning cycles and/or a means for manual determination of the necessity of a cleaning cycle.

A computing device which includes a process and memory, such as random access memory (RAM), may be utilized. The computing device may be used in combination with other components of an implementation including, but not limited, to a controller and display device. The computing device may operate in combination with connected devices to effectuate the dispense of a customized beverage. The computing device may also perform actions according to software operating in the device.

A means to clean and sanitize components exposed to a user interacting with the vending machine for the purpose of beverage vending may also be included. All surfaces exposed to the user are easily sanitized and cleaned. More specifically, areas of the vending machine exposed to fluid through the beverage vending process, hereinafter called the dispense area, are regularly sanitized through a sanitization cycle. In one implementation, the cycle may include an ultra violet (UV) sanitization light 125 to effectuate the sanitization of the dispense area. Other implementations may utilize hot fluid, such as water, at a temperature of approximately 190 degree F. and/or sanitization fluid such as a bleach solution to effectuate the cleaning of the dispense area. One implementation may activate a UV light after the vending cycle or at some other time for a period necessary to inhibit bacterial growth and that of potential pathogens in the dispense area. In another implementation, a surface in the dispense area may be immersed in sanitization solution to effectuate the removal of harmful bacteria from the dispense area.

A means to ensure the safe dispense of hot fluid where hot fluid is defined as fluid at a temperature of above 100 degree F. may also be incorporated. The safe method reduces the risk of burn and/or other related injury to a user. In one implementation, such a safe method is effectuated through the use of a temperature sensor that measures, directly and/or indirectly, the surface temperature of a container. The method may include means to terminate dispense of hot fluid and/or lower the surface temperature in the event that the surface temperature of the container reaches or exceeds a temperature threshold. For example, a user places a metallic container in the dispense area and effectuates dispense of hot fluid. After fluid enters the container, a temperature sensor indicates that the surface temperature exceeds 100 degree F. The present invention then halts dispense of hot fluid and dispenses cold fluid at a temperature of about 45 degree F. until the temperature sensor indicates that the surface temperature is below the temperature threshold of approximately 100 degree F. Other implementations may utilize similar but different methods of detecting unsafe temperature levels.

A method to determine the volume and/or size of a container into which fluid is dispensed may also be incorporated. One implementation utilizes an array of proximity sensors located in a pattern to allow for the computation and approximation of container size. For example, one implementation utilizes a various ultrasonic range finders may be arranged in a hemispherical pattern around the container bay to determine the dimensions of a container. An algorithm then transforms dimensional data received from the range finders and calculates approximate container volume. Other implementations may utilize means which determine or approximate container volume by measuring other properties, such as mass, without departing from the scope of the present invention.

A method to verify the presence of a container in the dispense area may also be incorporated. Such a method allows for the vending machine to terminate dispense of fluid in the event that there is no container present into which fluid will be dispensed. One implementation may use an ultrasonic range finder to verify the presence of an object in the dispense area. Other implementations may use various other means to verify the presence of a container into which fluid will be dispensed.

A method to encourage the alignment of a container opening and the dispensed fluid so as to ensure that dispensed fluid enters the container may be incorporated. One implementation utilizes dimensional sensors and a multi-dimensional actuator to position a dispense nozzle over and above the container opening. Other implementations may use various other methods including a combination of sensors and messages that inform the user of the status of alignment between the container opening and the dispense nozzle. Another implementation may present an image of the dispense nozzle and the container opening to a user and allow the user to effectuate dimensional adjustments to ensure the flow of dispensed fluid into the container.

A method to prevent the overfill or flow of fluid out of a container opening may be incorporated. Such an event may occur during the fluid dispense process. One implementation utilizes a dimensional sensor that measures the speed of fluid rise in a container. This implementation may then sense a change in speed of said fluid which may indicate that the container has reached maximum fluid capacity. For example, an ultrasonic range finder indicates that fluid is rising in a container at a velocity of $V_o$. Then the sensor indicates that the current velocity, $V_c$, of the fluid has decreased by a given factor, k, or $V_o = V_c/k$. This decrease in velocity further indicates, by implication, that the fluid is no longer rising in the container and has begun to flow out of the container opening.

A method to ensure that fluid passing through fluid paths as a component of a clean cycle does not enter a container located below a dispense nozzle may be incorporated. One implementation effectuates this method by incorporating a multi-directional valve which is connected to a drain and to a dispense nozzle. In the event of a clean cycle, the multi-directional nozzle is positioned to ensure that fluid does not flow into the dispense nozzle and instead flows into a drain or re-circulation loop that is part of the clean cycle. For example, before dispensing fluid, a fluid path is filled with hot water at a temperature of approximately 190 degree F. The fluid path is connected to a normally closed 3-way solenoid valve which controls the flow of fluid either to a dispense nozzle or to the drain. The 3-way solenoid is de-energized and thus all hot fluid entering said valve passes to a fluid path connected to the drain. This ensures that hot fluid does not enter a dispense nozzle. Other implementations may utilize other types of valves or methods to effectuate this method.

A method to store information on a customer identification device may also be incorporated. In one implementation, the device is a customer's near field radio frequency identification (RFID) tag. In other implementations the device may present itself as a personal communication or entertainment device such as an MP3 player or cell phone. Still other implementations may utilize various other devices capable of passing and storing information.

In one implementation, information containing information specific to the owner of the device is sent from the vending machine to the device for storage. This information is then stored for later use by a user and/or the vending machine For example, a customer possesses an RFID tag which stores information pertaining to the customer's account balance and beverage preferences. In the event that the customer utilizes the RFID device to identify himself to the vending machine, the information previously described is passed to the vending machine. The information is then utilized to effectuate the personalization and/or beverage vending experience of the customer. Other implementations may utilize stored information for other purposes relating to the customer experience.

A method which enables customers to create or modify an aspect of their account and/or view information pertaining to the vending machine through electronic means may be incorporated. In one implementation, this is effectuated through the utilization of an electronic application such as an iPhone® application, Android® application and/or other electronic application. For example, a customer uses an iPhone® application to create a custom beverage and add it to his account. The next time this customer identifies himself to an implementation, he may be given the option of dispensing the beverage created on the application. In another example, a customer utilizes an iPhone® application to view locations of the vending machines near that specific customer's location. Other implementations may utilize various other electronic means to effectuate this method. Such other electronic means may include a web site, a social media outlet (e.g. Facebook®) or other information conduit.

A method to present advertisements to one or more users within a given proximity may also be incorporated. The advertisements may be tailored to a specific user and/or intended for a general audience.

A method to store customer information in a database may also be incorporated. The database may be utilized by various implementations of the vending machine to share and retain information pertaining to a customer, beverage components, location and various other information that are utilized to effectuate the beverage customization, vending process, and/or customer experience. For example, a database contains information pertaining to volumes of beverage ingredients to ensure that the ingredients are replaced before they empty. In another implementation, the database contains information pertaining to an individual customer's name, beverage history, beverage preferences, affiliations, age, gender, location and other personal attributes. This information is passed from the database to an implementation in the event that a customer identifies himself. The information may be utilized to customize the customer experience and present the customer with known preferences.

Figure 10:
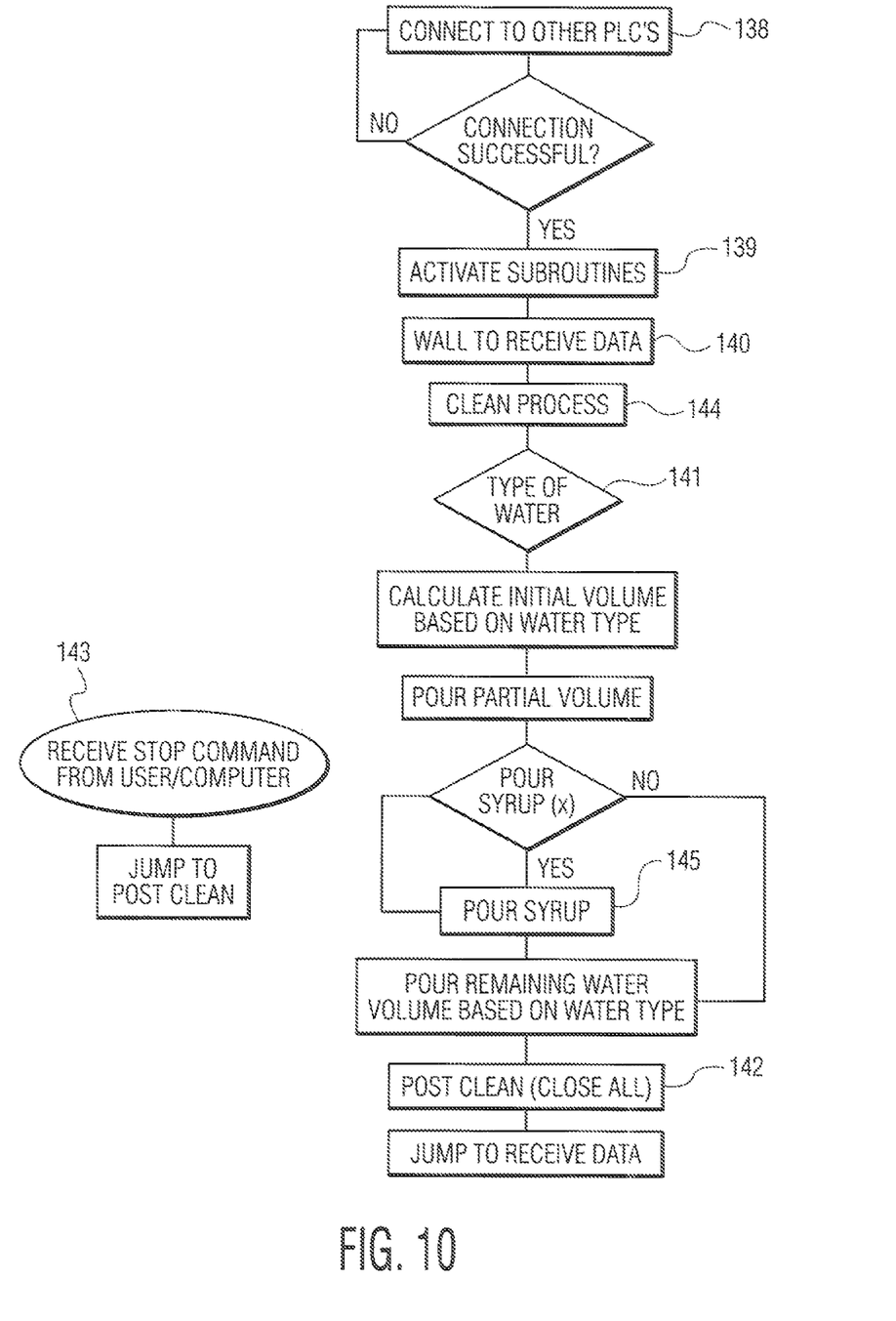
FIG. 10 is a flow chart depicting the control process relating to beverage vending in an implementation.

FIG. 10 illustrates a process through which a controller may effectuate the dispense of a customized beverage. In an implementation, the process initializes upon the establishment of communication between all controlling devices 138. The process continues with the confirmation of successful communion. If successful, the process continues and controller subroutines are activated 139. Following this, the controller waits to receive data encompassing the information necessary to dispense a beverage 140. When the information is received, the clean process 144 performs a pre-determined cleaning algorithm which may include the use of hot water to clean lines before dispense. The type of water 141 desired is selected and appropriate dispense volumes are calculated. Then a ratio of the total beverage volume is dispensed and a process determines whether or not syrup was requested. If syrup was requested a pour syrup 145 algorithm controls the dispense of the desired volume of single or multiple syrups. If syrup was not requested or upon completion of the pour syrup process 145, the remaining beverage volume is dispensed. Following this event the post clean 142 process performs a cleaning algorithm to clean fluid paths and the controller or controllers wait to receive the data necessary to dispense another beverage. At any point in the process described above, a stop command 143 may interrupt the process immediately moving said process to the post clean 142 event.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A beverage dispensing method comprising:
   providing one or more beverage dispensers for dispensing a beverage; each of the one or more beverage dispensers comprising:
   a plurality of reservoirs holding separate ingredients to be used in beverage recipes, wherein the separate ingredients include one or more selected from the group consisting of one or more waters, one or more flavor ingredients, one or more acids, one or more sweeteners and one or more supplements,
a mixing manifold interconnected with the plurality of reservoirs;
a processor to control the mixing manifold to mix any combination of the plurality of separate ingredients; and
a dispense nozzle in communication with the mixing manifold to dispense the customized beverage that has been mixed in the mixing manifold;
storing user account information in one or more memory devices in communication with the one or more beverage dispensers;
identifying a desired user of the one or more beverage dispensers via an authentication device;
determining if the desired user has a user account and is an authorized user;
customizing one or more beverages to be dispensed by utilizing a user created beverage recipe for controlling the mixing of one or more of the separate ingredients selected from the group consisting of one or more waters, one or more flavor ingredients, one or more acids, one or more sweeteners and one or more supplements taken from the plurality of reservoirs for deposit within the mixing manifold to be mixed, wherein the user created beverage recipe is a result of the user personally selecting the particular combination of the separate ingredients and an amount, concentration, percentage or ratio of the separate ingredients to be used to mix the customized beverage, wherein the user created beverage recipe comprises a plurality of:
selecting one or more of flavor ingredients by the user;
regulating the relative strengths of the flavor ingredients by the user,
selecting a sweetener type by the user;
regulating the relative sweetness level of the sweetener type by the user;
selecting one or more water choices by the user;
regulating a temperature range of the selected water choices from cold to hot by the user; and
regulating a carbonation level of the selected water choices from none to fully carbonated by the user;
dispensing the customized beverage that has been mixed in the mixing manifold from the dispense nozzle; and
storing the one or more customized beverages as recipes in the one or more memory devices.

2. The beverage dispensing method according to claim 1, further comprising:
storing a user's history of beverages dispensed from the one or more beverage dispensers in the one or more memory devices;
designating one or more beverages as a user's favorite beverages and storing the favorite beverages in the one or more memory devices; and
designating recommended beverages for the user based on the user's history of beverages dispensed from the one or more beverage dispensers and storing the recommended beverages for the user in the one or more memory devices.

3. The beverage dispensing method according to claim 1, further comprising providing one or more user interfaces in communication with the one or more memory devices and the one or more beverage dispensers adapted for:
accessing and managing user account information;
customizing one or more beverages; and
designating one or more beverages as a user's favorite beverages;
wherein the one or more user interfaces are at least one of incorporated within the one or more beverage dispensers or remote from the one or more beverage dispensers and in communication with the one or more memory devices and the one or more beverage dispensers over a network.

4. A beverage dispensing system of claim 3, further comprising a device to measure an exterior temperature of a container into which the beverage has been dispensed and to inform the user of a potential hot surface when the temperature exceeds a predefined value.

5. The beverage dispensing method of claim 3, wherein the one or more user interfaces further comprises an interactive display for displaying a menu, with the menu including a selection to allow a user to personally create a customized beverage, with the menu including a list of the plurality of separate ingredients that are displayed and available to be selected by the user to be mixed and for the user to designate the amount, concentration, percentage or ratio of each of the plurality of separate ingredients to create the customized beverage, wherein the menu further including a list of a user's favorite beverages for selection by the user.

6. The beverage dispensing method of claim 1 user input device for providing a user identifier, or a reader configured to read one or more devices on which a user identifier is contained.

7. The beverage dispensing method of claim 6, wherein the user input device comprises a key pad for input of the user identifier, and wherein the one or more devices comprises a magnetic stripe card, a smart card, an RFID tag, a computer, a mobile device or a digital audio player adapted to communicate with the reader for reading of the user identifier, wherein the user identifier comprises a user name or a user password.

8. The beverage dispensing method of claim 1, wherein determining if the desired user is an authorized user comprises verifying there are adequate funds to pay for a beverage to be dispensed.

9. The beverage dispensing method of claim 8, wherein the adequate funds may be a credit stored on the user account, a link to a credit card, a debit card or a bank account stored on the user account, or a payment device incorporated within the one or more beverage dispensers, wherein the payment device comprises at least one of a cash machine, a coin machine, a credit card reader or a debit card reader.

10. A beverage dispensing method of claim 1, further comprising a plurality selected from the group consisting of:
verifying the presence of a container into which the beverage will be dispensed;
permitting the beverage to be dispensed only when a container has been verified in proper position;
determining at least one of the volume or size of the container into which the beverage will be dispensed to regulate the amount of beverage to be dispensed;
measuring an exterior temperature of a container into which the beverage has been dispensed;
informing the user of a potential hot surface when the temperature of the container exceeds a predefined value;
automatically cleaning the one or more beverage dispensers at defined times;
personalizing beverage names associated with particular user defined custom beverages created by a user;
displaying the one or more personalized beverage names of the user on a user interface to be offered to other users to try;

designating a rating of the one or more personalized beverage names after the associated user defined custom beverage has been tried by any of the other users;

wherein the rating comprises one or more selected from the group consisting of the top rated or top selling of the personalized beverage names;

selecting a parental control stored in the one or more memory devices and programmed for designating permitted usage by a child user comprising one or more of:

defining a number of beverages permitted to be consumed over a given time period;

defining types of beverages permitted to be consumed;

defining specific ingredients that may or may not be consumed; and defining one or more specific nutritional supplements to be included in each custom beverage.

* * * * *